(12) United States Patent
Skirko

(10) Patent No.: US 7,590,268 B1
(45) Date of Patent: Sep. 15, 2009

(54) METHOD AND APPARATUS FOR REPRESENTING AN AREA OF A RASTER IMAGE BY A CENTERLINE

(75) Inventor: Peter Skirko, Santa Clara, CA (US)

(73) Assignee: Adobe Systems Incorporated, San Jose, CA (US)

(*) Notice: Subject to any disclaimer, the term of this patent is extended or adjusted under 35 U.S.C. 154(b) by 570 days.

(21) Appl. No.: 11/252,503

(22) Filed: Oct. 17, 2005

(51) Int. Cl.
*G06K 9/00* (2006.01)
*G06K 9/40* (2006.01)
*G06K 9/42* (2006.01)
*G06K 9/44* (2006.01)

(52) U.S. Cl. .................... 382/118; 382/115; 382/116; 382/117; 382/254; 382/258; 382/259

(58) Field of Classification Search .................. 382/254
See application file for complete search history.

(56) References Cited

U.S. PATENT DOCUMENTS

| | | | | |
|---|---|---|---|---|
| 4,914,708 A | * | 4/1990 | Carpenter et al. | 382/156 |
| 5,144,685 A | * | 9/1992 | Nasar et al. | 382/153 |
| 5,396,265 A | * | 3/1995 | Ulrich et al. | 345/158 |
| 5,715,331 A | | 2/1998 | Hollinger | |
| 5,734,756 A | * | 3/1998 | Sherman et al. | 382/259 |
| 5,870,103 A | | 2/1999 | Luo | |
| 5,929,860 A | * | 7/1999 | Hoppe | 345/419 |
| 6,049,339 A | | 4/2000 | Schiller et al. | |
| 6,064,747 A | * | 5/2000 | Wills et al. | 382/100 |
| 6,178,539 B1 | * | 1/2001 | Papadopoulou et al. | 716/7 |
| 7,126,578 B1 | | 10/2006 | Hamburg | |

OTHER PUBLICATIONS

Ogniewicz et al. Pattern Recognition, vol. 28, No. 3, pp. 343-359, 1995.*
Guibas et al. Primitives for the Manipulation of General Subdivisions and the Computation of Voronoi Diagrams, ACM Transactions on Graphics, vol. 4, No. 2, Apr. 1985, pp. 74-123.*
Grossberg et al. Perception & Psychophysics 1985, 38 (2), p. 141-171, Neural dynamics of perceptual grouping: Textures, boundaries, and emergent segmentations.*

* cited by examiner

*Primary Examiner*—Vikkram Bali
*Assistant Examiner*—Michelle Entezari
(74) *Attorney, Agent, or Firm*—Robert C Kowert; Meyertons, Hood, Kivlin, Kowert & Goetzel, P.C.

(57) ABSTRACT

One embodiment of the present invention provides a system that can represent an area of a raster image by a centerline. During operation, the system receives a planar map which represents a raster image that contains a region. Note that the region corresponds to a face in the planar map whose edges correspond to the boundaries of the region. Next, the system determines a centerline for a subregion within the region which is currently represented by an outline. The system then transforms the planar map so that the subregion is represented by the centerline.

24 Claims, 6 Drawing Sheets

METHOD AND APPARATUS FOR REPRESENTING AN AREA OF A RASTER IMAGE BY A CENTERLINE

RELATED APPLICATIONS

The subject matter of this application is related to the subject matter in a co-pending non-provisional application by the same inventors as the instant application entitled, "PLANAR MAP TO PROCESS A RASTER IMAGE," having U.S. patent application Ser. No. 11/178,526, and filing date 11 Jul. 2005. The above listed reference is hereby incorporated by reference herein to provide details of how a raster image can be traced using a planar map. Further, the subject matter of this application is also related to the subject matter in a co-pending non-provisional application by the same inventors as the instant application entitled, "MERGE AND REMOVAL IN A PLANAR MAP OF A RASTER IMAGE," having U.S. patent application Ser. No. 11/178,878, and filing date 11 Jul. 2005.

BACKGROUND

1. Field of the Invention

The present invention relates to techniques and systems for processing digital images. More specifically, the present invention relates to a method and an apparatus for representing an area of a raster image by a centerline.

2. Related Art

As computer systems become more powerful, they are being used for increasingly computationally intensive image-processing tasks. One such task is "tracing," which involves converting a raster image into a vector image.

Note that representing an image using vector art has many advantages. A vector image is usually resolution independent, whereas the quality of a raster image depends heavily on the resolution. Further, since a vector image has an inherent structure, it is typically much easier to edit than a raster image, which often requires the use of low-level pixel editing tools, such as Adobe® Photoshop Brush tool.

A raster image can typically be traced using two main techniques: outline (fill) tracing or centerline (stroke) tracing. Outline tracing represents boundaries of regions with filled paths, whereas centerline tracing represents parts of regions as stroked paths.

Unfortunately, current techniques for tracing can exhibit gaps in their color fill output. This "gapping" problem typically occurs because, in some situations, current tracing techniques do not respect adjacencies between regions.

To eliminate such gapping problems, a planar map based technique for tracing raster images was presented in U.S. patent application Ser. No. 11/178,526, entitled, "PLANAR MAP TO PROCESS A RASTER IMAGE," by inventor Peter Skirko, filed on 11 Jul. 2005. Note that a planar map based tracing technique does not suffer from gapping problems because a planar map inherently respects adjacencies between regions.

Note that it is often advantageous to represent an image using a combination of outlines and centerlines because it can allow the image to be edited in an intuitive fashion.

For example, a cartoonist may want to represent certain regions of an image using centerlines instead of outlines. Specifically, a centerline could be used for the lines of the face and eyes, and outline for the pupil and ears where it is solid-filled. Using centerlines can be very advantageous because it can enable the cartoonist to intuitively edit a part of the drawing by simply manipulating the centerlines. In contrast, such editing operations can be very cumbersome when outlines are used because the cartoonist would have to simultaneously manipulate two closely spaced lines which can be very awkward.

Another advantage of using centerlines is that it allows a user to "idealize" a drawing. For example, if the user drew a wobbly line on the paper (as part of a cartoon, technical drawing, map, etc.), the user can "idealize" the line by using centerlines. Specifically, the line in the image might wobble around a thickness of 2 pt., but by using centerlines, the artist can make it exactly 2 pt. Furthermore, the user can also apply the same width across all the centerlines in the image, further idealizing it.

Hence, it is very advantageous to be able to represent an area of a raster image by a centerline. Note that planar map constructs are closely related to well known digital imaging concepts. Specifically, faces represent regions, edges represent pieces of boundaries shared by exactly two regions, and vertices represent locations where three or more regions meet. Unfortunately, centerlines are not similarly related to a well known concept in digital imaging. This makes it particularly difficult to find a way to extend a planar map representation to convey centerline information.

Once a raster image is traced, it is often operated upon by a graphics art tool. Present art generators typically use current boundaries to identify emergent boundaries on-the-fly. However, the art generator usually has no choice but to group all the emergent boundaries for a given face into a monolithic compound path. This is disadvantageous because a graphic art tool, such as Adobe® Illustrator, may not be able to edit such compound paths conveniently. Furthermore, artists typically want disjoint subfaces to be separate entities so they can delete one subface but keep the other, or use a subface in a different art piece.

Hence what is needed is a method and an apparatus for tracing raster images without the above-described problems.

SUMMARY

One embodiment of the present invention provides a system that can represent an area of a raster image by a centerline. During operation, the system receives a planar map which represents a raster image that contains a region. Note that the region corresponds to a face in the planar map whose edges correspond to the boundaries of the region. Next, the system determines a centerline for a subregion within the region which is currently represented by an outline. The system then transforms the planar map so that the subregion is represented by the centerline.

In a variation on this embodiment, the system uses a winged-edge data structure to represent the planar map.

In a variation on this embodiment, prior to receiving the planar map, the system generates the planar map. Specifically, the system generates the planar map by first receiving the raster image. Next, the system partitions the raster image into a set of regions. Note that the raster image can be partitioned based on color, e.g., the raster image can be partitioned so that all pixels in a region have the same color. The system then generates an initial planar map by: creating a face for every region in the set of regions; creating a vertex where three or more regions meet; and creating an edge for each piece of boundary between two vertices. Finally, the system generates the planar map by merging regions in the initial planar map.

In a variation on this embodiment, the system automatically selects the subregion before determining the centerline for the subregion. Specifically, the system selects the subregion by first generating a Voronoi diagram based on the pixel locations of the outline of the region. Next, the system determines a medial axis for the region using the Voronoi diagram. The system then computes a width of the region along the medial axis. Finally, the system selects the subregion based on the width. In one embodiment, the system represents the Voronoi diagram using a quad-edge data structure.

One embodiment of the present invention provides a system that associates an emergent boundary with a subregion. During operation, the system receives a planar map which represents a raster image which contains a region. Next, the system represents an area within the region by a centerline, which creates emergent boundaries and subregions. Next, the system identifies an emergent boundary in the region. The system then identifies a set of subregions within the region. Finally, the system associates the emergent boundary with a subregion in the set of subregions.

In a variation on this embodiment, the system represents the area within the region by the centerline by: generating a Voronoi diagram based on the pixel locations of the outline of the region; determining a medial axis for the region using the Voronoi diagram; and determining a centerline using the medial axis.

In a further variation on this embodiment, the system identifies subregions with the region by flooding the Voronoi diagram.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Tracing

Tracing is the process of converting a raster image into vector art. An application (e.g., Adobe® Illustrator) that can trace raster images usually provides many possible vector primitives: paths, gradients, gradient meshes, symbols, text, etc. Note that a tracing process is usually performed after the image has already been preprocessed. Preprocessing steps can include noise removal, blurring, and color-reduction.

Further, tracing typically occurs after an image is "posterized." Posterization partitions the image into regions that have pixels of the same color. After posterization, these regions can be traced using two techniques: outline (fill) tracing or centerline (stroke) tracing. Outline tracing represents boundaries of regions with filled paths, whereas centerline tracing represents parts of regions as stroked paths.

Figure 1A:
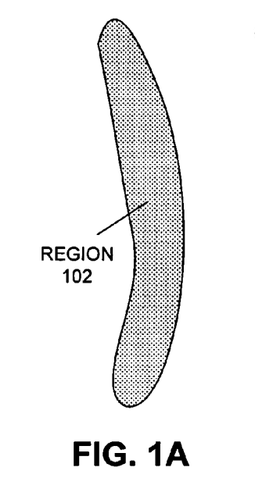
FIGS. 1A, 1B, and 1C illustrate how a region of a raster image can be traced using only outlines or only centerlines in accordance with an embodiment of the present invention.
Figure 1B:
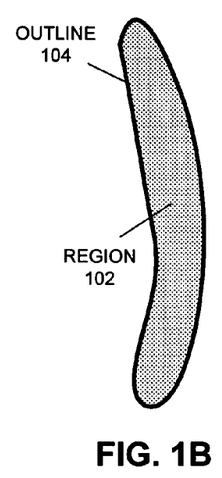
Figure 1C:
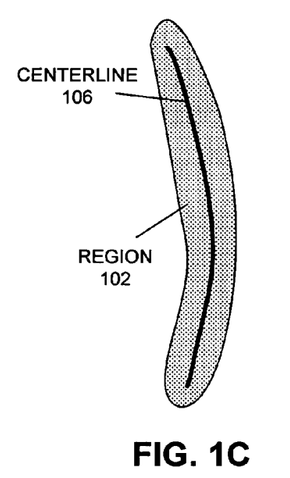

FIGS. 1A, 1B, and 1C illustrate how a region of a raster image can be traced using only outlines or only centerlines in accordance with an embodiment of the present invention.

Note that tracing is typically not an objective process, i.e., a raster image can correspond to a number of "correct" traced images. Hence, some amount of stylization invariably occurs. Sometimes this stylization is very neutral, while other times (e.g., exaggerated parameter values) it dramatically influences the look of the generated art.

Present techniques for tracing can exhibit gaps in their color fill output. This "gapping" problem can occur because a tracing technique does not respect adjacencies between regions. One embodiment of the present invention eliminates the gapping problem because it uses a planar map to represent a traced version of a raster image.

Outlines and Centerlines

Outline tracing uses filled paths exclusively to represent shapes. One embodiment of the present invention uses a combination of filled and stroked (or centerline traced) paths. For example, stroked paths can be used to represent areas of the shape which are thin (the "centerlines"), whereas filled paths can be used for the remaining areas. Using a combination of filled and stroked paths to represent an image can be advantageous because it can allow the image to be edited in an intuitive fashion. Furthermore, as noted before, centerlines can also allow "idealization" of hand drawings.

Figure 2A:
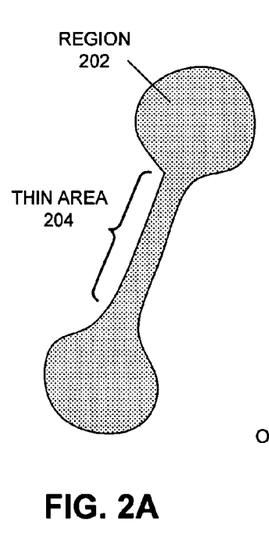
FIGS. 2A, 2B, and 2C illustrate how a region of a raster image can be traced using a combination of outlines and centerlines in accordance with an embodiment of the present invention.
Figures 2B, 2C:
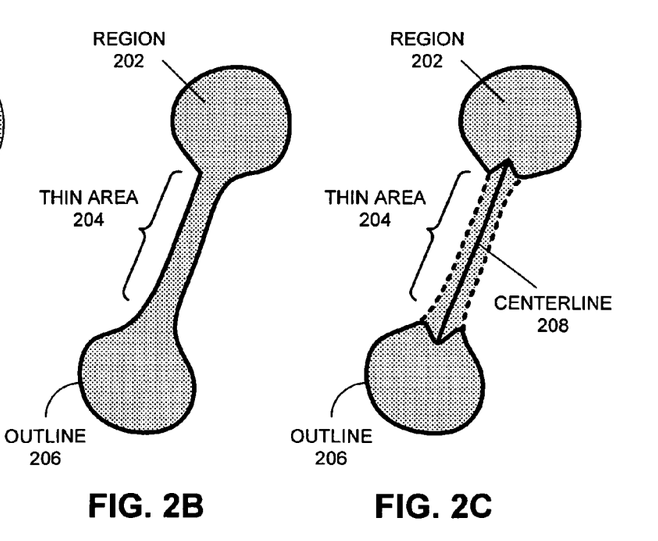

FIGS. 2A, 2B, and 2C illustrate how a region of a raster image can be traced using a combination of outlines and centerlines in accordance with an embodiment of the present invention.

Note that if the shape shown in FIG. 2A had been traced using only centerlines, it would look unnatural because a centerline is not a good approximation to the bells at the end of the dumbbell shape. Hence, determining where to use outlines and where to use centerlines can be an important feature of a tracing process. One embodiment of the present invention automatically determines where to use outlines and where to use centerlines to trace a raster image.

Tracing Raster Images Using Planar Maps

A planar map is a way of describing subdivisions of the plane. Specifically, a planar map comprises faces, edges, and vertices. Given a raster image, a tracing process can generate a planar map representing connective or topological relationships between regions. It also decorates this map with accurate geometric and color information about regions and their boundaries. Both topological and geometric information are needed to manipulate the image structure and generate the final art. One of the advantages of using a planar map is that it eliminates the possibility of introducing gaps in the final art. Other advantages of the planar map approach include its conceptual simplicity and quality.

A transformation of a planar map is defined as any process which modifies a planar map in a valid way (i.e. the planar map rules are preserved). This is accomplished by adding, deleting, and rewriting the components of the map. Two important stages of a tracing process—region merging/removal, and medial axis generation—can be formulated as planar map transformations. Note that, in general, geometry influences a transformation but the result is ultimately topological.

One embodiment of the present invention uses a planar map formulation known as the winged-edge data structure. Outer boundaries are oriented clockwise and inner boundaries counter-clockwise. Each face stores an "entry" edge for each of its boundaries. (Further details of the winged-edge data structure can be found in Bruce G. Baumgart, "Winged edge polyhedron representation," Tech. Rep. CS-TR-72-320, Stanford University, 1972.)

A tracing process typically begins by receiving a raster image. Next, the system enters a region-finding stage in which it generates an 8-connected planar map from the raster image. This stage is further divided into two sub-stages: initial planar map generation, and region merging/removal.

Initial planar map generation generates a 4-connected map from the raster image. Representing a raster image with a planar map is mostly intuitive but requires rules to disambiguate certain cases. The basic mapping from regions in the raster image to planar map objects is intuitively simple: faces should represent regions, edges should represent pieces of boundaries shared by exactly two regions, and vertices should represent locations where three or more regions meet. However, these rules must be formally specified. Specifically, these rules can be divided into two sets: region rules and graph rules. The region rules define how regions are precisely defined on the image, and the graph rules define how to represent those regions in the planar map.

In one embodiment, regions comprise same-colored pixels mutually connected along pixel-edges, and a boundary of a region comprises a closed, directed sequence of pixel-edges with the region to its right. Boundaries are generated by following a 4-connected loop in the region, locally rotating clockwise. Globally clockwise boundaries are "outer" and globally counterclockwise are "inner." Further, every inner boundary denotes a subgroup. If a subgroup contains a single region, that region is isolated. Additionally, there exists a null region whose subgroup is the entire image.

Note that the above rules generate a 4-connected planar map. But, 8-connectivity is ultimately desired, since it better captures image appearance and continuity than does 4-connectivity. However, 8-connectivity is inherently ambiguous, whereas 4-connectivity is not. For example, the same-colored squares in a checkerboard only touch at corners and can be grouped in many ways: along diagonals, zig-zagging, or not at all. This is the reason why the system first creates a 4-connected planar map, and then uses region merging and region removal operations to transform the 4-connected planar map into an 8-connected planar map.

The graph rules are as follows: (a) create a face for every region, (b) create a vertex where three or more regions meet, and (c) create an edge for each piece of boundary between two vertices. Note that these rules are largely self-explanatory. Isolated regions require an arbitrary vertex choice because their outer boundary is shared by only two regions, not three or more. Additionally, since every boundary is traversed with respect to one region, every given boundary piece/edge must be visited twice, once for each adjacent face.

In one embodiment, the system can utilize a crack dictionary to generate a planar map for a given raster image. A crack is the interface between two pixels consecutive in a row (vertical crack) or column (horizontal crack). A crack dictionary stores an entry for vertical cracks that have been visited on a boundary traversal. Each entry has separate values for each direction of the crack since each direction is visited independently. The entry can be queried if a crack has been visited in a certain direction, and also provides additional state needed by the implementation.

After the region-finding stage, the process enters a region merging/removal stage during which the system "promotes" the initial planar map from 4-connectivity to 8-connectivity (merging diagonals), and merges faces according to a level-of-detail parameter (merging small regions).

Note that level-of-detail merging is not strictly needed during tracing. However, decreasing or coarsening the level-of-detail can have pleasurable artistic effects. Furthermore, it can be used as a broad cleanup "filter" for removing unwanted noise and anti-aliasing artifacts.

Note that merging and removal can be separate sub-stages: merging generates the new faces in the map and removal rewrites edges and vertices accordingly. Further, merging and removal can also be architecturally independent. Specifically, as long as merging obeys a set of rules, removal can correctly transform the planar map.

Region merging generates a list of new faces in the map, as a partition of the old faces. This list is used by region removal to transform the map. As previously mentioned, this comprises two phases: merging diagonals and merging small regions.

In addition to the architectural independence of merging and removal, merging diagonals can also be architecturally independent of merging small regions. Merging diagonals creates an 8-connected planar map from a 4-connected planar map.

One of the fundamental concepts in region merging is the concept of an equivalence region, which is a set of faces in the map that have been "merged" and will comprise one face in the transformed map. Note that a face can belong to at most one equivalence region, but not all faces need be merged.

The faces in an equivalence region must be mutually 8-connected, i.e., they must share at least an edge or a vertex. To construct equivalence regions, the process performs a sequence of merging operations, which fall into two categories: merging across edges and merging across vertices. Faces can be merged with other faces to form equivalence regions, and existing equivalence regions can also "consume" lone faces or other equivalence regions.

Note that the initial 4-connected planar map guarantees that the two faces adjacent to an edge are always distinct. This is an important property because it guarantees that faces adjacent to an edge can always be merged into an equivalence region.

Since merging is typically performed sequentially, a particular edge might become "subsumed," i.e., the adjacent faces may belong to the same equivalence region. Such edges are ultimately discarded because they will not exist on a boundary of the equivalence region's resulting face.

A valence-4 vertex is a candidate for merging across the vertex. (The valence of a vertex is the number of edges—which may or may not be unique—incident on it.) At such a vertex, four pieces of faces meet. It is possible that two of these pieces belong to the same face. This occurs when a face folds back on itself, a natural consequence of 4-connectivity. Note that at most one face may fold back at a vertex; two is topologically impossible. Thus, unlike merging across edges, merging across vertices occurs for pieces of faces, with two possible consequences: (a) two different faces are merged into an equivalence region, or (b) the same face is "merged with itself." The latter case does not change the membership of the equivalence region, but it does change the topology of the boundaries. In particular, an outer boundary can be split into separate outer and inner boundaries, and inner boundaries can be subdivided.

Merging across vertices is formalized by the concept of a crossing. Specifically, for each valence-4 vertex, two crossing directions (called diagonals), such as SW and SE, are defined. Merging may occur across one diagonal, or not at all. Merging simultaneously across both diagonals is not allowed because it would violate topological planarity.

Whenever a vertex is merged across, it is assigned a crossing value corresponding to the direction of the merge. This information must be explicitly recorded because it cannot be derived from the map or the equivalence regions. Crossing values are later used during region removal to disambiguate boundaries.

After the region merging stage, the process enters the region removal stage. Region removal transforms the planar map in accordance with the equivalence regions generated in region merging. The principal operations of this stage are: (a) remap regions, and (b) collapse edges.

Remap regions transforms the faces of the map while leaving edges and vertices in place. Specifically, the system creates a new face for each equivalence region, and then updates all edge pointers to reference the new face as appropriate. Note that outer and inner boundaries of the new face are (almost by definition) different from its constituent boundaries. Hence, for each new face, remap region identifies these new boundaries which represent the new face.

Collapse edges simultaneously removes redundant edges and vertices from a boundary. Specifically, it inspects consecutive pairs of edges on the boundary, and if their shared vertex is collapsible, it removes the vertex and collapses the edges. Formally, given a vertex v, and two edges $e_1$ (into v) and $e_2$ (out of v) on a boundary, v is collapsible if the regions to the left of $e_1$ and $e_2$ are the same, and the regions on the right of $e_1$ and $e_2$ are also the same. Note that vertices with crossings are always collapsible because the crossing introduces a small topological channel which pushes apart the adjacency.

Process for Representing an Area of a Raster Image by a Centerline

Figure 3:
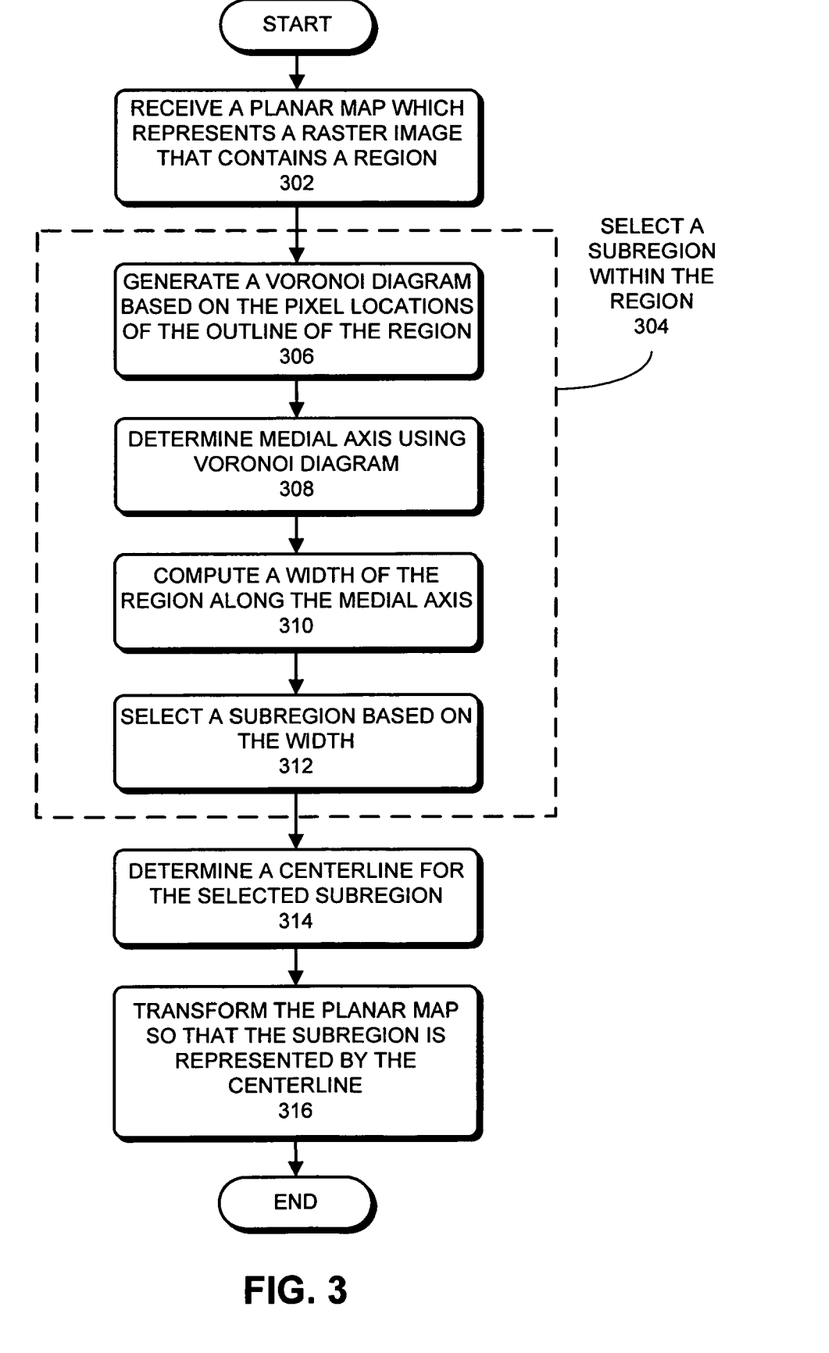
FIG. 3 presents a flowchart that illustrates a process for representing an area of a raster image by a centerline in accordance with an embodiment of the present invention.

FIG. 3 presents a flowchart that illustrates a process for representing an area of a raster image by a centerline in accordance with an embodiment of the present invention.

The process typically begins by receiving a planar map which represents a raster image that contains a region (step 302). Note that the region corresponds to a face in the planar map whose edges correspond to an outline of the region.

Figure 4A:
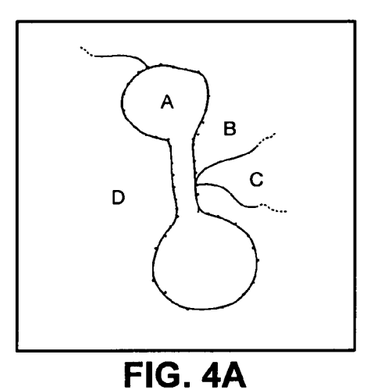
FIG. 4A illustrates a portion of a planar map that represents a region within a raster image in accordance with an embodiment of the present invention.

FIG. 4A illustrates a portion of a planar map that represents a region within a raster image in accordance with an embodiment of the present invention. The planar map shown in FIG. 4A divides an area of the raster image into four regions, namely, A, B, C, and D. Each of these regions corresponds to a face in the planar map.

The system then selects a subregion within the region to represent using a centerline (step 304). In one embodiment, a user can specify a subregion within the region that needs to be represented using a centerline.

In another embodiment, the system can automatically select the subregion based on a width along a medial axis of the region. A medial axis is an object that describes the "center" of a geometric shape. A Voronoi diagram, when carefully processed, is often a good approximation to a medial axis.

One embodiment uses a Voronoi diagram to identify a medial axis, which it then used for centerline tracing. Medial axis generation (or transformation) transforms the 8-connected planar map into a new map that conveys centerline information. Note that a key aspect of medial axis generation is that it transforms a planar map in a valid fashion. Medial axis generation comprises three main substages: (a) truncated Voronoi diagram generation, (b) medial axis classification, and (c) medial axis splicing and linking. Truncated Voronoi diagram generation produces the basic data structure which the other stages manipulate. Medial axis classification and splicing/linking, are analogous to region merging and removal. In particular, classification is analogous to merging as it decides the geometric look of the result. Splicing/linking is analogous to removal, as it transforms the map to conform to this new geometry.

Medial axis transformation can also be divided into substeps in a different way: interior transformation, and exterior transformation. The main steps of interior transformation are: (a) represent parts of faces as centerlines using matched-pairs, and (b) represent rest of face as outlines and splice face edges together. The main steps of exterior transformation are: (a) generate shell edges and regions in order to preserve geometric shape of face, and (b) link exterior edges.

Continuing with the flowchart of FIG. 3, the system then generates a Voronoi diagram based on the pixel locations of the outline of the region (step 306).

Figure 4B:
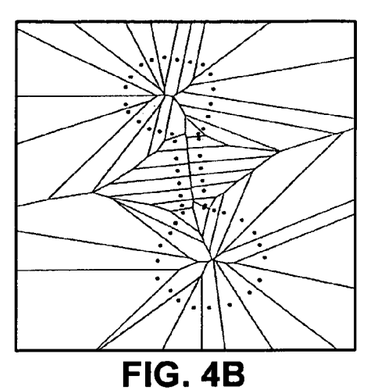
FIG. 4B illustrates how a Voronoi diagram can be generated based on the pixel locations of the outline of a region in accordance with an embodiment of the present invention.

FIG. 4B illustrates how a Voronoi diagram can be generated based on the pixel locations of the outline of a region in accordance with an embodiment of the present invention. (Note that FIG. 4B is for illustration purposes only, and does not represent an actual Voronoi diagram that was generated based on pixel locations of the outline.)

A Voronoi diagram defined on a set of locations (called sites) in the plane is a subdivision of the plane into cells, one cell per site. Each cell denotes an area of points closest to its site. Edges between cells denote equidistant points between two sites; vertices between cells denote an equidistant point between 3 or more sites.

Note that the Voronoi diagram is also a topological data structure. If the result is computed exactly (no round-off error whatsoever), the connectivity of the vertices and edges in the diagram is faithfully captured. If round-off error occurs, the particular implementation might produce an incorrect output (wrong connectivity or missing parts), or worse still, crash or never terminate. Thus, exact arithmetic (via special libraries) is crucial to Voronoi diagram computation.

The basic theory of medial axis generation is built upon the paper Guibas, L. and Stolfi, J., "Primitives for the Manipulation of General Subdivisions and the Computation of Voronoi Diagrams," ACT TOG, 4(2), April, 1985 (hereinafter, "Guibas"). This paper describes both a process and data structure for Voronoi diagram generation. Specifically, this paper describes a Voronoi in terms of its dual structure: the Voronoi diagram of a set of sites is the dual of the Delaunay triangulation of those sites. The dual is very important for medial axis generation, because the boundaries of the face are "embedded" in the Delaunay triangulation. The dual relationship provides a way to associate points on the boundary and the nearby Voronoi structure.

Guibas also introduces the quad-edge data structure, the basic data structure for manipulating the Voronoi diagram and its dual. The central object in the quad-edge data structure is the edge record, which represents one edge in the diagram and simultaneously its dual edge in the triangulation. Since these edges can be used as directed or undirected, the edge record represents the "quad" of the two directed Voronoi edges and their two dual directed Delaunay edges. These records also store pointers to the sites (Delaunay or Voronoi) upon which the edges are incident.

Edge records are not manipulated directly; an edge reference object is used to manipulate one of the four directed edges in the record. These references implement an "edge algebra" (as described in the paper) specifying both how to modify and traverse the data structure.

Like the winged-edge data structure, the quad-edge data structure represents a planar subdivision with the topology completely described in the edges. In the winged-edge data structure, the connectivity is premised on traversing faces. However, for the quad-edge data structure, faces are not explicitly represented, and the connectivity allows for both face traversal as well as "spinning" about a site in a counter-clockwise or clockwise fashion.

Finally, Guibas also describes a divide-and-conquer technique for computing the Voronoi diagram and Delaunay triangulation. The input to the technique is a sorted set of sites and its output is the appropriate quad-edge data structure.

The present invention extends and improves upon the techniques and systems described in Guibas. An important new concept introduced in the present invention is "truncation." Simply stated, truncation is ignoring parts of the Voronoi diagram outside of the face's boundaries. Any edge crossing from inside to outside the boundary is truncated to ignore the outside part. Parts of the Voronoi diagram extend beyond the face's boundaries in three ways: (a) into an inner boundary, (b) out of a concave section of the outer boundary, and (c) edges connecting to the site at infinity. Note that truncation requires utilizing the embedded boundaries in the Delaunay triangulation.

Figure 4C:
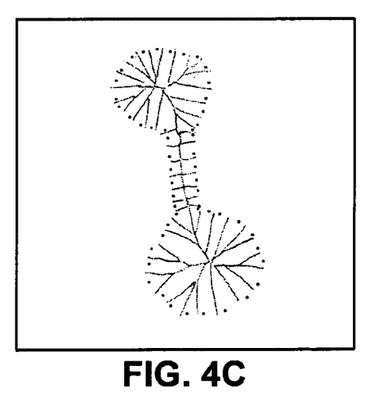
FIG. 4C illustrates how a Voronoi diagram can be truncated in accordance with an embodiment of the present invention.

FIG. 4C illustrates how a Voronoi diagram can be truncated in accordance with an embodiment of the present invention.

Another important extension is the introduction of vertices in addition to sites. Vertices are introduced to represent additional information independent from a site. Not all sites have associated vertices, and the geometric value at a vertex is sometimes deliberately different than its corresponding site.

Yet another extension is introduction of imaginary edges. These edges preserve, in the Voronoi diagram, the 8-connectivity in the planar map. An imaginary edge is added for each crossing, connecting the sites on either side.

A summary of the steps required to generate a truncated Voronoi diagram are as follows: (a) generate the point-set from a given face's boundaries, (b) compute the Voronoi diagram for the point-set, (c) truncate the Voronoi diagram by identifying boundary edges, (d) initialize active Voronoi sites, (e) add imaginary edges over crossings, (f) initialize Delaunay and Voronoi vertices.

The point-set is defined as the input set of sites generated from the boundaries. Sites are implemented using the multisite object. The multisite represents both the (unique) geometric location as well as additional information needed for processing. For a given multisite, at most two boundaries, and at most two edges from each boundary, can touch it. Also, a given boundary can fold-back and touch the multisite twice, although at most one boundary can do this because two is topologically impossible.

Multisites are used in two contexts: as Delaunay sites just described, as well as the Voronoi sites discussed below. The Voronoi sites are not members of the point-set as defined above. Next, the technique produces the quad-edge data structure representing the Voronoi diagram/Delaunay triangulation based on the point-set.

The system then truncates the Voronoi diagram by identifying boundary edges. A boundary edge is an edge which passes directly between two consecutive points on a boundary. Under certain conditions, it can be mathematically proven that boundary edges exist for all such pairs of points. For example, if the geometric points on boundaries correspond to the "pixel-corners," and if boundaries never interpenetrate, then it can be mathematically proven that boundary edges exist for all such pairs of points.

To identify the boundary edges, the system can walk the "loop" of Delaunay edges/sites on a given boundary. Between a pair of points, the system can rotate to find the corresponding Voronoi edge, which must be the boundary edge, and labels it as such.

Edges and vertices inside the face are called active. The system then explicitly initializes the active Voronoi sites. Next, for each Voronoi site, the system computes the geometric center of its generating circle. The system then adds an imaginary edge across each crossing.

Continuing with the flowchart of FIG. 3, the system then determines a medial axis for the region using the Voronoi diagram (step 308).

In one embodiment, the medial axis is determined during a medial axis classification process that decides which pieces of the medial axis should be represented using centerlines.

Medial axis classification generates matched-pairs to represent parts of faces as centerlines. More importantly, it decides where those centerlines should and should not be. Medial axis classification comprises the following substages: (a) pruning, which removes extraneous edges from the truncated Voronoi diagram so that it better represents a medial axis, (b) initializing trails, which generates a linearized data structure of the pruned Voronoi diagram, (c) edge inclusion/exclusion, which decides which edges in the pruned Voronoi diagram should and shouldn't be represented as centerlines, (d) projection, which maps planar map vertices on boundaries onto centerlines, and (e) collecting/embedding, which generates the matched-pairs and grafts them onto edges in the pruned Voronoi diagram.

Pruning removes extraneous edges from the truncated Voronoi diagram so that it best represents a medial axis. It does not literally delete these objects but rather labels them as removed. The result is called the pruned Voronoi diagram (PVD).

The truncated Voronoi diagram is an exact data structure: it precisely represents the parts of the Voronoi diagram inside the face. However, many of these edges are not good approximations to the medial axis and should be removed. For example, most boundary edges should be removed because they are geometrically too close to the boundaries; they stick out like "tendrils."

Pruning is a subjective process: the goal of best representing a medial axis must be balanced with accidentally removing important features and keeping unnecessary ones.

Pruning uses a "boundary-inward" methodology: it starts at the boundary edges and moves inward only when doing so is unambiguous.

In essence, pruning performs a "circular reconstruction" of the remaining graph and pruning fails whenever this reconstruction is inadequate. Even though circular reconstruction is not entirely accurate with the stroke/fill assignments used to generate the final art, it works well in practice.

Pruning step is largely based on the method discussed by Jonathan W. Brandt and V. Ralph Algazi, "Continuous Skeleton Computation by Voronoi Diagram," CVGIP: Image Understanding, vol. 55:3, pp. 329-338, May 1992 (hereinafter "Brandt").

Figure 4D:
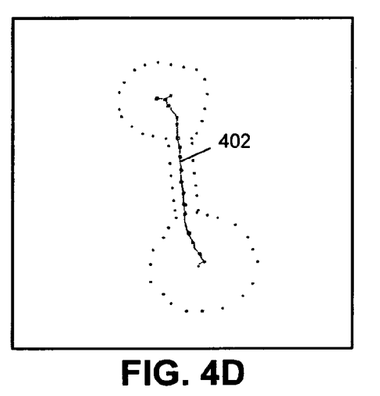
FIG. 4D illustrates how a truncated Voronoi diagram can be pruned to reveal a medial axis of a region in accordance with an embodiment of the present invention.

FIG. 4D illustrates how a truncated Voronoi diagram can be pruned to reveal medial axis 402 of a region in accordance with an embodiment of the present invention.

A trail is the linearization of the pruned Voronoi diagram into a set of lists for computational use. Specifically, it is a linearization of the surfaces on the PVD. Each boundary has its "corresponding" surface on the PVD and mappings are constructed to map boundary points onto surface points and vice-versa. Basically, surfaces encode (on the Voronoi diagram) the fact that the boundaries of the face do not interpenetrate. This sub-stage generates one trail for each surface on the PVD.

A trail is generated by walking the pruned Voronoi diagram. Given a directed edge e on one surface of the PVD, the next edge on the surface is found by locally rotating clockwise about e. The same undirected edge may appear at most twice in the trail, once for each direction seen when walking. The technique exhausts all the surfaces in this manner. All edges visited during this rotation, on or off the PVD, are considered part of the trail.

The result is a sequence of spikes and non-spikes: spikes are the directed pruned/failed edges incident on the PVD "rotated through" and pointing outwards; non-spikes are the directed edges actually on the PVD "rotated onto."

Spikes are included in the trail because they are computationally useful—for example, they are used in projection. Note that spikes are not included in the medial axis per se. Further, note that pruned or failed edges that are not incident to the PVD are not spikes.

The trail generally comprises arbitrary runs of spikes and non-spikes. Contiguous spikes often represent termini in the PVD, but can also represent a general convex location. Contiguous non-spikes occur less frequently than one might imagine; they usually represent a concave bend in the structure.

Continuing with the flowchart of FIG. 3, the system then computes a width of the region along the medial axis (step 310).

In one embodiment, the system computes a width of the region along the medial axis during an inclusion/exclusion process that decides which edges in the pruned Voronoi diagram are to be represented as centerlines. If the inclusion/exclusion process determines that an edge is to be represented as a centerline, it labels the edge as "included." The remaining edges are represented as outlines and are labeled "excluded."

As with pruning, inclusion/exclusion labeling is subjective; the goal of effecting a good segmentation between centerlines and outlines must be balanced with avoiding various artifacts, such as spurious outlines ("chunks"), spurious centerlines ("small lines"), poor transitions between outline and centerline, etc. But, in general, the basic paradigm for inclusion/exclusion is based on estimating widths along the medial axis.

Next, the system selects the subregion within the region based on the width (step 312).

In one embodiment, the system includes (or selects) those edges whose width is below a user-supplied "max width" threshold; the other edges are excluded (or ignored). In other words, thin areas become centerlines.

Figure 4E:
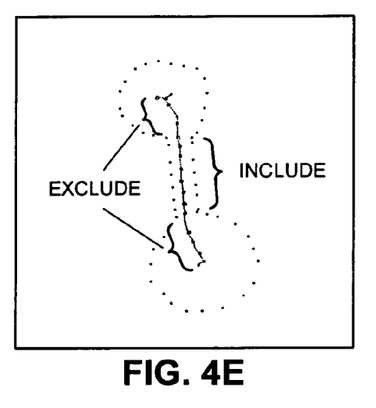
FIG. 4E illustrates how a width along a medial axis can be used to select a subregion within a region in accordance with an embodiment of the present invention.

FIG. 4E illustrates how a width along a medial axis can be used to select a subregion within a region in accordance with an embodiment of the present invention.

The system then determines a centerline for the selected subregion based on the medial axis (step 314). Note that the subregion is currently represented by an outline.

In one embodiment, the system uses the included portion of the medial axis shown in FIG. 4E as the centerline for the selected subregion.

The system then transforms the planar map so that the subregion is represented by the centerline (step 316). This step involves a number of sub-steps which are described in further detail below.

One of the steps in the transformation involves projecting planar map vertices on the face's boundaries onto Voronoi vertices in the pruned Voronoi diagram. Each such Voronoi vertex projected onto becomes a planar map vertex during collecting and embedding, which generates the matched-pairs from included edges.

Figure 4F:
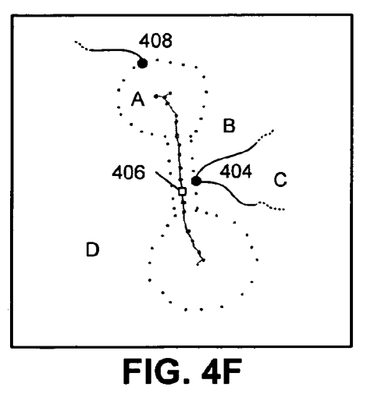
FIG. 4F illustrates how planar map vertices can be projected onto the Voronoi diagram in accordance with an embodiment of the present invention.

FIG. 4F illustrates how planar map vertices can be projected onto the Voronoi diagram in accordance with an embodiment of the present invention.

For example, planar map vertex 404 can be projected onto the Voronoi diagram to create vertex 406. Note that not all planar map vertices are projected; only those that are associated with a centerline are projected. For example, planar map vertex 408 is not projected onto the Voronoi diagram.

The included edges form a subgraph of the PVD. An included vertex is a Voronoi vertex incident on an included edge. The valence of an included vertex is the number of included edges incident on it.

Analogous to initial planar map generation, the rules for collecting and embedding capture the "high-level topology" of the included edges.

Specifically, collecting and embedding involves: (a) creating a planar map vertex for each non-valence-2 included vertex, (b) projecting an included vertex onto the Voronoi diagram, (c) if the edges form a loop, adding an arbitrary vertex, and (d) creating a matched-pair of edges is for each unique sequence of included edges between these planar map vertices.

A key aspect of the present invention is that it conveys centerline information transforming a planar map which maintains the properties of a planar map. Specifically, centerline information is embodied in the matched-pair planar map construct. A matched pair is two edges with a common "inner" region and geometrically coincident endpoints. It represents the narrowing of a face into an infinitesimal width but general length. Note that, in practice, the engine must treat matched-pairs specially when generating the final art output. It is important to note that the matched-pair is represented using one stroked path, rather than two filled paths.

Figure 4G:
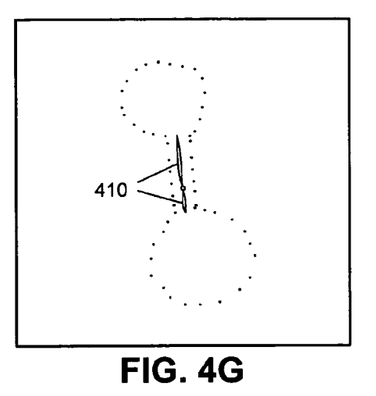
FIG. 4G illustrates how a matched-pair can be used to transform a planar map to convey centerline information in accordance with an embodiment of the present invention.

FIG. 4G illustrates how a matched-pair can be used to transform a planar map to convey centerline information in accordance with an embodiment of the present invention.

Matched-pair 410 shown in FIG. 4G can be used to convey centerline information associated with the included edges shown in FIG. 4E.

These matched-pairs, when created, exist in isolation. They are not yet connected to the planar map; their pointers are null. Embedding attaches these edges to the pruned Voronoi diagram. Specifically, given the sequence $e_1, \ldots, e_n$ of included PVD edges which generated a matched-pair, $e_1$ and $e_n$ have pointers pointing to the matched-pair. The matched-pairs are thus "embedded" in the low-level pruned Voronoi diagram, and are accessible by traversing the latter data structure. Note that embedding is necessary for medial axis linking. Otherwise the matched-pairs are just "floating in space" and not accessible. Any process traversing either the PVD or the trails has access to embedded matched-pairs.

Given the matched-pairs embedded in the pruned Voronoi diagram, splicing and linking transforms the face to include the matched-pairs, introduces shell faces and edges to preserve the geometric shape of the face, then finally reconnects the face and its shell into the planar map. Whereas medial axis classification decides the look of the centerlines, splicing and linking updates the map accordingly.

Figure 4H:
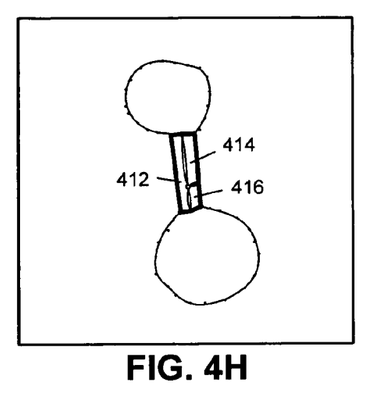
FIG. 4H illustrates how shell regions can be introduced onto the planar map to preserve the shell or geometric shape of the original face in accordance with an embodiment of the present invention.

FIG. 4H illustrates how shell regions can be introduced onto the planar map to preserve the shell or geometric shape of the original face in accordance with an embodiment of the present invention.

First, splicing and linking transforms the face to include the matched-pairs. This is accomplished by cutting the boundary edges into pieces represented by centerline (matched-pairs) and the pieces representing outline. The pieces represented by centerline are momentarily ignored, and the pieces representing outline are connected to the matched-pairs using "dummy splice" edges. Each boundary in the original face maps to a new boundary on the transformed face (now containing matched-pairs); the connectivity of the face is preserved.

Next, splicing and linking introduces shell faces and edges. For example, the system can create shells 412, 414, and 416 to transform the face to include matched-pairs 410. The shell is defined as the original geometric shape of the face, prior to medial axis generation. Including matched-pairs causes the shell to "cave in" in its vicinity. This is rectified by "padding" these areas with faces to restore the original geometric shape. Each piece of boundary edge represented by centerline—from the previous step—becomes the "top" of the shell; the bottom is one or more matched-pairs, and the left and right sides are the adjacent dummy-splice edges. Note that shell faces were introduced to enable medial axis generation on a fully general planar map.

Stated differently, a shell face is introduced wherever a centerline has cut away the face. Its purpose is to maintain the overall geometric shape of the face. For example, if face A is adjacent to a centerlined piece of face B, then part of face A's boundary will comprise centerlines. This prevents face A from itself being centerlined because its boundary must only comprise outline edges and points. By introducing the shell face between A and B, A's boundary will always comprise only outline edges and points, and so A can be centerlined independently of what happens to B or any of its neighbors. Further, note that shells preserve processing order-independence.

In summary, a key reason for introducing shells is that this system requires the pixel-corner located points on boundaries. In absence of shells, medial axis generation can introduce arbitrarily-located points onto a boundary, which can "disqualify" that boundary from further medial axis processing.

Finally, splicing and linking reconnects the face and its shell into the planar map. This is largely a bookkeeping exercise (albeit a subtle and non-obvious one) in rewriting edge pointers so they remain properly connected.

Figure 4I:
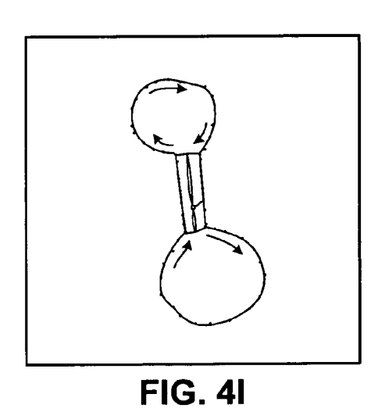
FIG. 4I illustrates how splicing can be used to rewrite edge pointers so that faces maintain internal connectivity in accordance with an embodiment of the present invention.

FIG. 4I illustrates how splicing can be used to rewrite edge pointers so that faces maintain internal connectivity in accordance with an embodiment of the present invention.

Figure 4J:
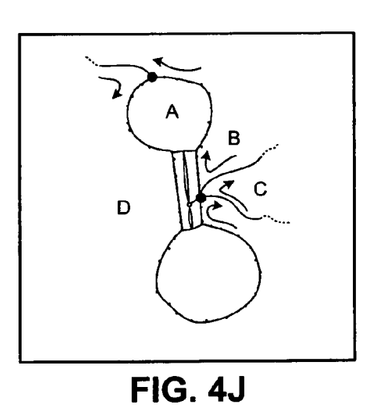
FIG. 4J illustrates how linking can be used to rewrite edge pointers so that faces maintain external connectivity in accordance with an embodiment of the present invention.

FIG. 4J illustrates how linking can be used to rewrite edge pointers so that faces maintain external connectivity in accordance with an embodiment of the present invention.

In one embodiment, splicing and linking is implemented using the splice/link architecture which comprises two types of objects: splices and links. A splice represents a connection between edges on the face with respect to the current face. A link object represents a connection between edges (not necessarily on the face) with respect to an external face. This is analogous to region-finding: each edge has two independent sides, and thus two pointers to faces, each of which are written independently.

The architecture is implemented in two steps. The first step generates the entire set of splice and link objects; the second step processes them—connecting edges as specified. Each splice object contains one or more link objects; there are no link objects not associated with a splice. Splicing and linking is executed once for each trail/surface on the medial axis, as generated during medial axis classification. In other words, splicing operates on each surface independently. Since the matched-pairs are embedded in the pruned Voronoi diagram, they are also embedded in the trail. Each matched-pair comprises two "sides" (one edge in the pair per side), and each side is embedded in the same or a different trail.

Process for Creating a Compound Path

Compound path pairing pairs the inner and outer emergent boundaries on a centerlined face for art output. It is typically performed after medial axis generation, and it does not change the topological structure of the planar map, but merely encodes additional information which allows the art generator to interpret the map differently.

When dealing with centerlined faces, three types of boundaries can be defined. The original boundaries are the boundaries prior to medial axis generation; the current boundaries are those right after; and finally, the emergent boundaries are the boundaries enclosing filled areas in the output art. The current and emergent boundaries differ because centerlines—as represented by matched-pairs—should not be part of an output boundary. The output art for centerlined faces comprises two parts: closed/filled Bezier paths representing outlines, and open/stroked Bezier paths representing centerlines. This is what the artist expects.

Given the current boundaries, the art generator determines the emergent boundaries on-the-fly. The matched-pairs are easily identified and output appropriately. However, in this scheme, the art generator has no choice but to group all the outer and inner emergent boundaries for a given face into a monolithic compound path. This is disadvantageous because a graphic art tool, such as Adobe® Illustrator, may not be able to edit such compound paths conveniently. Furthermore, artists typically want disjoint subfaces to be separate entities so they can delete one subface but keep the other, or use a subface in a different art piece.

The basic framework of compound path pairing is to tag each emergent boundary (note that boundary data is stored on the side of the edge pertaining to that boundary) in the planar map with three pieces of information: (a) an emergent boundary ID, (b) whether this boundary is outer or inner, and (c) if inner, the ID of the outer emergent boundary to which it is paired (i.e. its "paired-ID"). Given this information, the art generator can successfully generate a compound path for each disjoint subface. The end result is easier to edit in a graphic art tool, such as Adobe® Illustrator.

Compound path pairing typically involves the following steps: (a) tag boundaries, (b) flood fill, (c) resolve edges, (d) generate subfaces, and (e) pair compound paths.

Figure 5:
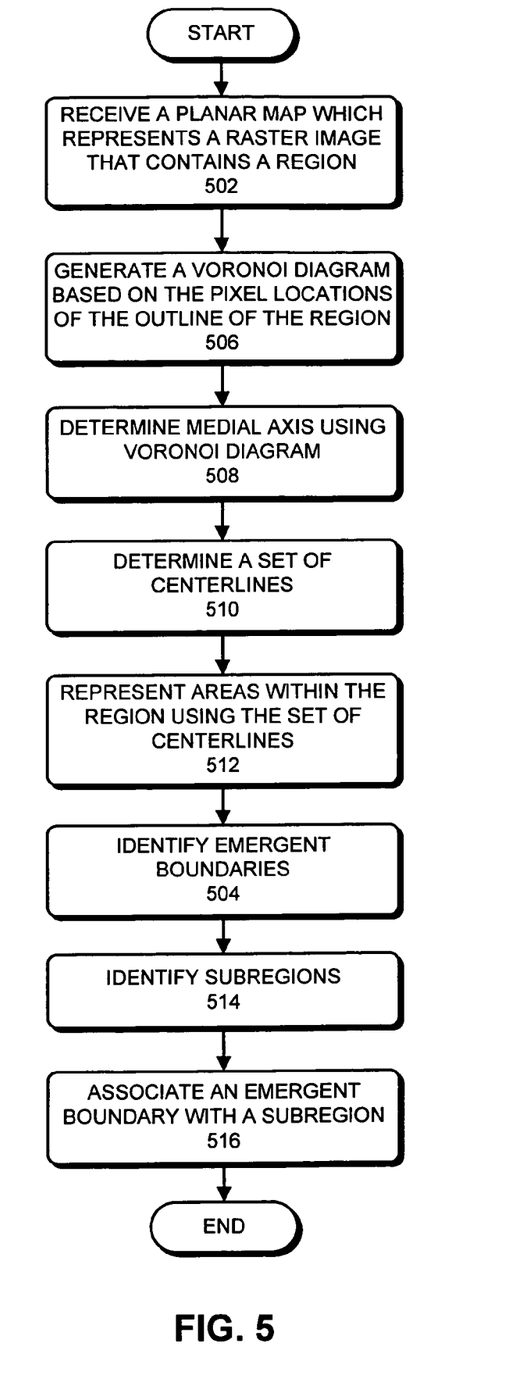
FIG. 5 presents a flowchart that illustrates a process for creating a compound path in accordance with an embodiment of the present invention.

FIG. 5 presents a flowchart that illustrates a process for creating a compound path in accordance with an embodiment of the present invention.

The process typically begins by receiving a planar map which represents a raster image which contains a region (step 502).

Next, the system identifies emergent boundaries. Given the current boundaries of a face, this step finds the emergent boundaries and assigns each edge on such a boundary its emergent boundary ID value. Previously, finding emergent boundaries was done by the art generator on-the-fly; however, compound path pairing is premised on the emergent boundaries and so must do it first.

Specifically, in one embodiment, before identifying emergent boundaries, the system generates a Voronoi diagram based on the pixel locations of the outline of the region (step 506).

The system then determines a medial axis for the region using the Voronoi diagram (step 508).

Next, the system determines a set of centerlines using the medial axis (step 510).

Figure 6A:
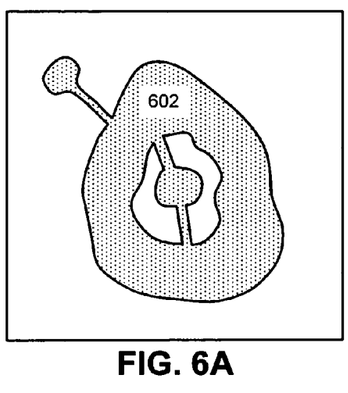
FIGS. 6A and 6B illustrate how areas within the region can be represented using centerlines in accordance with an embodiment of the present invention.
Figure 6B:
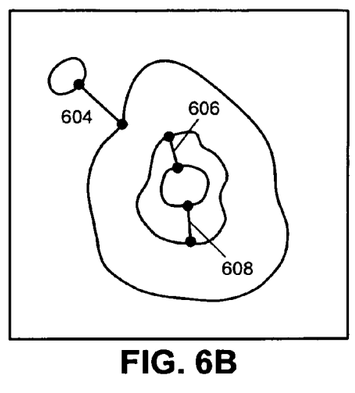

FIGS. 6A and 6B illustrate how areas within the region can be represented using centerlines in accordance with an embodiment of the present invention.

Specifically, centerlines 604, 606, and 608 shown in FIG. 6B were determined for region 602 shown in FIG. 6A. Note that each centerline represents an area within region 602.

The system then represents areas within the region using the set of centerlines (step 512). Note that this step can create emergent boundaries and subregions.

Next, the system identifies emergent boundaries (step 504).

Figure 6C:
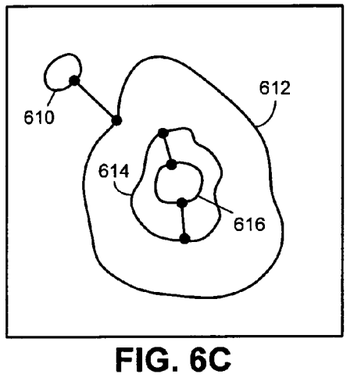
FIG. 6C illustrates the emergent boundaries of a region in accordance with an embodiment of the present invention.

FIG. 6C illustrates the emergent boundaries of a region in accordance with an embodiment of the present invention.

Specifically, emergent boundaries 610, 612, 614, and 616 were determined based on the centerlined version of region 602. The system performs the following steps for each current boundary of region 602: (a) find initial emergent boundary edge (i.e. ignore any matched-pair edges), and (b) find successive edges on emergent boundary.

The system finds the successive edges by "spinning through" any adjacent matched-pairs. Note that at most two matched-pairs can be spun through this way.

Furthermore, medial axis classification results in faces which are perfectly disjoint with respect to the pruned Voronoi diagram, i.e., two distinct subfaces share neither a Voronoi vertex nor a Voronoi edge. Hence, it is impossible to have two distinct faces incident on a junction—the bifurcation is not allowed.

Also note that an emergent outer boundary can comprises edges from a current outer boundary, from both outer and inner boundaries, and (somewhat counter-intuitively) entirely from inner boundaries.

Continuing with the flowchart of FIG. 5, the system then identifies a set of subregions within the region (step 514).

In one embodiment, the system uses a flood fill step to identify disjoint subregions (or subfaces) in the region (or face) with a flood-fill operation on the truncated Voronoi diagram.

Specifically, the flood fill step involves: (a) finding a seed (i.e. excluded and not yet flooded) edge on the PVD (not TVD), (b) flooding outwards along all excluded edges on the TVD (not PVD) stopping at boundary edges, and (c) for each vertex encountered, assigning a subface ID. Note that flooding starts on the PVD but extends across the TVD. Furthermore, note that every Voronoi vertex of every subface is guaranteed to have the proper identifier.

Figure 6D:
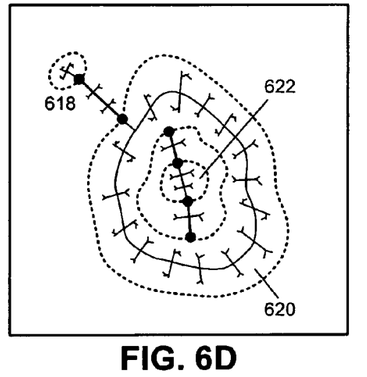
FIG. 6D illustrates how a set of subregions can be identified by flooding a Voronoi diagram in accordance with an embodiment of the present invention.

FIG. 6D illustrates how a set of subregions can be identified by flooding a Voronoi diagram in accordance with an embodiment of the present invention. (Note that FIG. 6D is for illustration purposes only, and does not represent an actual flooding of a truncated Voronoi diagram.)

For example, subregions 618, 620, and 622 can be identified by flooding the truncated Voronoi diagram.

Continuing with the flowchart of FIG. 5, the system then associates an emergent boundary with a subregion (step 516).

Figure 6E:
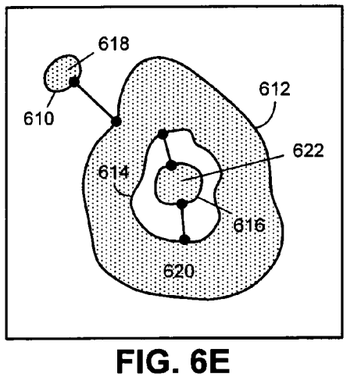
FIG. 6E illustrates how emergent boundaries can be resolved to their subregion in accordance with an embodiment of the present invention.

FIG. 6E illustrates how emergent boundaries can be resolved to their subregions in accordance with an embodiment of the present invention.

Note that emergent boundaries 612 and 614 are associated with subregion 620. Similarly, emergent boundary 610 is associated with subregion 618, and emergent boundary 616 is associated with subregion 622.

Specifically, the system first resolves edges of emergent boundaries to identify to which subface (subregion) a given emergent boundary edge belongs. This is done by resolving the edge—associating the edge with a component of the flood-filled TVD. Resolving is performed for a given emergent boundary edge, then the result is propagated to the other edges on the emergent boundary.

Resolving can be performed using two techniques: (a) two-point resolve, and (b) vertex resolve.

Two-point resolve uses two consecutive boundary points on the edge to index into a boundary edge on the Delaunay triangulation. This is then rotated into its Voronoi counterpart on the TVD. The outward vertex on the boundary Voronoi edge provides the correct subface ID. Note that such vertices are special because their geometry is defined specially as the midpoint even though topologically they should be "outside."

Vertex resolve is used for one-point edges. Such edges by definition cannot use two-point resolve, but every one-point edge is adjacent to two dummy-splice edges. The Voronoi vertex associated with these dummy-splice edges provides the correct subface ID.

Note that both mechanisms are needed. A subface (subregion) may be bounded by only one-point and dummy-splice edges, and must use vertex resolve. A subface (subregion) may also be bounded only by original boundaries, and thus contain no dummy-splice edges; it must use 2-pt resolve.

The reason two boundary points, not one, are needed is because of an inherent ambiguity with one boundary point when dealing with fold backs.

Once all emergent boundaries are resolved with subface IDs, the subface (subregion) data structure is constructed. This is a transient container comprising one object per subface. Each subface (subregion) object has a list of all the emergent boundaries of the subface.

Finally, the system tags each emergent boundary as inner and outer boundaries. Specifically, for each subface (subregion), the system first identifies the outer emergent boundary and tags it as outer. The system then tags the remaining boundaries in the subface as inner. This is because every subface has exactly one outer boundary. Hence, once the outer boundary is identified, the remaining boundaries must be inner.

Subfaces were collected in the previous step, however, no outer/inner designation was made. Identifying inner and outer cannot be done with topology alone since they are relative viewpoints.

To solve this problem, an absolute geometric frame of reference must be provided. This is done by noticing that the structure of a face is hierarchical. A face comprises one or more top-level subfaces. Each subface contains zero or more holes (inner emergent boundaries). Finally, each hole contains zero or more subfaces as "islands" connected by matched-pairs.

The system basically inspects this structure top-down. This is done by maintaining two queues: inner and outer boundaries. First, the system seeds the outer boundary queue with the outer boundaries of the top-level subfaces. The system then performs the following steps while each queue is not empty: (a) for a boundary in the outer boundary queue, (b) designate it as outer, (c) designate all other boundaries on the subface as inner (by way of the subface containers), (d) add all the now-designated inner boundaries to the inner boundary queue, (e) for a boundary in the inner queue, (f) discover all subface islands within the hole by traversing the planar map locally, (g) for each outer boundary found, add to outer boundary queue.

Note that this process is typically performed in an iterative fashion rather than a recursive fashion. In other words, subfaces are descended independently.

Figure 6F:
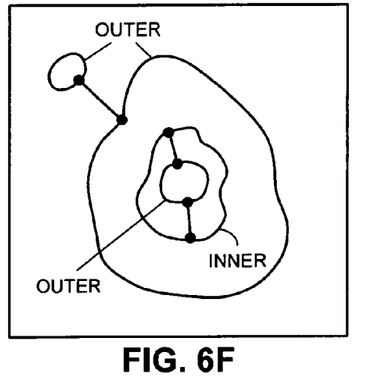
FIG. 6F illustrates how emergent boundaries can be identified as outer or inner boundaries in accordance with an embodiment of the present invention.

FIG. 6F illustrates how emergent boundaries can be identified as outer or inner boundaries in accordance with an embodiment of the present invention.

Once the emergent boundaries have been identified as inner and outer boundaries, they can be grouped together to form a compound path. For example, inner boundary 614 and outer boundary 612 associated with subregion 620 can be grouped together to form a compound path.

Note that grouping these emergent boundaries in this manner creates disjoint subfaces that can be manipulated independently of one another. For example, a user can delete one subface but keep the other, or use a subface in a different art piece.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for representing an area of a raster image by a centerline, the method comprising: using a computer to perform:

receiving a planar map which represents a raster image that contains a region, wherein a face in the planar map maps to the region in the raster image, and wherein the edges of the face map to the boundary of the region;

selecting as a subregion of the region a portion of the region whose width, as measured across the region from one boundary point to another boundary point, does not exceed a maximum-width threshold, wherein both the subregion and a portion of the region outside the subregion are currently represented by an outline comprising the edges of the face;

determining a centerline for the subregion, wherein the centerline coincides with at least a portion of a medial axis of the region;

transforming the planar map so that the subregion is represented by the centerline, and so that the portion of the region outside the subregion is represented by an outline comprising a portion of the edges of the face.

2. The method of claim 1, wherein prior to receiving the planar map, the method comprises:

receiving the raster image;

partitioning the raster image into a set of regions;

generating an initial planar map by:

creating a face for every region in the set of regions;

creating a vertex where three or more regions meet; and creating an edge for each piece of boundary between two vertices; and generating the planar map by merging regions in the initial planar map.

3. The method of claim 1, wherein the selecting as a subregion of the region comprises:

generating a Voronoi diagram based on the pixel locations of the outline of the region;

determining the medial axis for the region using the Voronoi diagram; and measuring the width of the region from one boundary point to another boundary point by measuring orthogonally to the medial axis.

4. The method of claim 1, wherein transforming the planar map involves:

projecting vertices from the planar map onto the medial axis;

generating matched-pairs based on the medial axis; and creating new faces in the planar map based on the matched-pairs.

5. The method of claim 1, wherein the planar map is represented using a winged-edge data structure;

wherein all pixels in the region have the same color.

6. The method of claim 3, wherein the Voronoi diagram is represented using a quad-edge data structure.

7. A computer-readable storage device storing instructions that when executed by a computer cause the computer to perform a method for representing an area of a raster image by a centerline, the method comprising:

receiving a planar map which represents a raster image that contains a region, wherein a face in the planar map maps to the region in the raster image, and wherein the edges of the face map to the boundary of the region;

selecting as a subregion of the region a portion of the region whose width as measured across the region from one boundary point to another boundary point does not exceed a maximum-width threshold, wherein both the subregion and a portion of the region outside the subregion are currently represented by an outline comprising the edges of the face;

determining a centerline for the subregion, wherein the centerline coincides with at least a portion of a medial axis of the region;

transforming the planar map so that the subregion is represented by the centerline, and so that the portion of the region outside the subregion is represented by an outline comprising a portion of the edges of the face.

8. The computer-readable storage device of claim 7, wherein prior to receiving the planar map, the method comprises:

receiving the raster image;

partitioning the raster image into a set of regions;

generating an initial planar map by:
creating a face for every region in the set of regions;
creating a vertex where three or more regions meet; and
creating an edge for each piece of boundary between two vertices; and generating the planar map by merging regions in the initial planar map.

9. The computer-readable storage device of claim 7, wherein the selecting as a subregion of the region comprises:

generating a Voronoi diagram based on the pixel locations of the outline of the region;

determining the medial axis for the region using the Voronoi diagram; and measuring the width of the region from one boundary point to another boundary point by measuring orthogonally to the medial axis.

10. The computer-readable storage device of claim 7, wherein transforming the planar map involves:

projecting vertices from the planar map onto the medial axis;

generating matched-pairs based on the medial axis; and creating new faces in the planar map based on the matched-pairs.

11. The computer-readable storage device of claim 7,
wherein the planar map is represented using a winged-edge data structure;
wherein all pixels in the region have the same color.

12. The computer-readable storage device of claim 9, wherein the Voronoi diagram is represented using a quad-edge data structure.

13. A method for associating an emergent boundary with a subregion, the method comprising: using a computer to perform:

receiving a raster image that contains a region;

representing an area within the region by a centerline, which creates disjoint subregions of the region and creates corresponding emergent boundaries which are distinct from the centerline;

identifying the emergent boundaries;

identifying the disjoint subregions;

associating each emergent boundary with one of the disjoint subregions;

distinguishing each emergent boundary as either an inner boundary or an outer boundary; and pairing each inner boundary with its corresponding outer boundary.

14. The method of claim 13, wherein prior to representing an area within the region by a centerline, the method further comprises:

partitioning the raster image into a set of regions;

generating an initial planar map by:
creating a face for every region in the set of regions;
creating a vertex where three or more regions meet; and
creating an edge for each piece of boundary between two vertices; and generating a planar map by merging regions in the initial planar map.

15. The method of claim 13, wherein representing the area within the region by the centerline involves:

generating a Voronoi diagram based on the pixel locations of the boundaries of the region;

determining a medial axis for the region using the Voronoi diagram; and determining a centerline using the medial axis.

16. The method of claim 13, wherein identifying the disjoint subregions involves flooding the Voronoi diagram.

17. The method of claim 13,
wherein all pixels in the region have the same color.

18. The method of claim 15, wherein the Voronoi diagram is represented using a quad-edge data structure.

19. A computer-readable storage device storing instructions that when executed by a computer cause the computer to perform a method for associating an emergent boundary with a subregion, the method comprising:

receiving a raster image that contains a region;

representing an area within the region by a centerline, which creates disjoint subregions of the region and creates corresponding emergent boundaries which are distinct from the centerline;

identifying the emergent boundaries;

identifying the disjoint subregions;

associating each emergent boundary with one of the disjoint subregions;

distinguishing each emergent boundary as either an inner boundary or an outer boundary; and pairing each inner boundary with its corresponding outer boundary.

20. The computer-readable storage device of claim 19, wherein prior to representing an area within the region by a centerline, the method further comprises:

partitioning the raster image into a set of regions;

generating an initial planar map by:
creating a face for every region in the set of regions;
creating a vertex where three or more regions meet; and
creating an edge for each piece of boundary between two vertices; and generating a planar map by merging regions in the initial planar map.

21. The computer-readable storage device of claim 19, wherein representing the area within the region by the centerline involves:

generating a Voronoi diagram based on the pixel locations of the boundaries of the region;

determining a medial axis for the region using the Voronoi diagram; and determining a centerline using the medial axis.

22. The computer-readable storage device of claim 19, wherein identifying the disjoint subregions involves flooding the Voronoi diagram.

23. The computer-readable storage device of claim 19,
wherein all pixels in the region have the same color.

24. The computer-readable storage device of claim 21, wherein the Voronoi diagram is represented using a quad-edge data structure.

* * * * *

UNITED STATES PATENT AND TRADEMARK OFFICE
CERTIFICATE OF CORRECTION

PATENT NO. : 7,590,268 B1
APPLICATION NO. : 11/252503
DATED : September 15, 2009
INVENTOR(S) : Peter Skirko It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this

Twenty-first Day of September, 2010

David J. Kappos
*Director of the United States Patent and Trademark Office*